ns* United States Patent Office 3,014,040
Patented Dec. 19, 1961

3,014,040
METHOD OF INCREASING THE PARTICLE SIZE OF SYNTHETIC RUBBER LATEX COMPRISING THE INCORPORATION OF A POLYVINYLPYRIDINE RESIN LATEX THEREIN
Louis H. Howland, Watertown, and Victor S. Chambers, Naugatuck, Conn., assignors to United States Rubber Company, New York, N.Y., a corporation of New Jersey
No Drawing. Filed June 27, 1960, Ser. No. 38,741
18 Claims. (Cl. 260—29.7)

This invention relates to increasing the particle size of synthetic rubber latices, and particularly to permit them to be concentrated to fluid latices of high solids content.

We have found that the particle size of an alkaline synthetic rubber latex may be greatly increased by the incorporation of a small amount of an alkaline polyvinylpyridine resin latex. Such synthetic rubber latices containing the polyvinylpyridine may readily be concentrated, preferably by evaporation concentration, to fluid high solids latices.

In carrying out the present invention there is incorporated in an alkaline synthetic rubber latex an alkaline polyvinylpyridine resin latex in amount to give 0.05 to 1% of a polyvinylpyridine resin based on the solids of the synthetic rubber latex.

The alkaline polyvinylpyridine latex will have a pH from 8 to 14 and may be incorporated in the alkaline synthetic rubber latex before, during or after polymerization of the synthetic rubber latex. The polyvinylpyridine latex is made in the conventional manner of polymerizing the polymerizable monomers in an alkaline aqueous emulsion in the presence of anionic surface-active dispersing agents and free radical producing catalyst and modifier. The monomers that may be used in the preparation of the polyvinylpyridine latex are the unsubstituted vinylpyridines, such as 2-vinylpyridine, 3-vinylpyridine, 4-vinylpyridine, and alkyl substituted vinylpyridines, such as 2-methyl-5-vinylpyridine, 5-ethyl-2-vinylpyridine, 2-ethyl-4-vinylpyridine, and 2,4 - dimethyl - 6 - vinylpyridine, and mixtures thereof, and mixtures of such vinylpyridines with up to 40% of such mixtures of monoethylenic compounds copolymerizable with vinylpyridine, such as styrene and acrylonitrile. Examples of such alkaline polyvinylpyridine latices are shown in Example I of the Pritchard U.S. Patent No. 2,746,943, and in recipes numbered 1 to 5 in Table 1 on page 864 of the article "Polyvinylpyridine Emulsifiers for Polymerization in Acid Media," by Pritchard, Apheim and Moyer, Ind. Eng. Chem. 47, 863–866 (April 1955). In the present invention, these alkaline polyvinylpyridine latices are added as such to the alkaline synthetic rubber latices to increase the particle size of the alkaline synthetic rubber latex containing conventional anionic emulsifiers, whereas in these references the polyvinylpyridine is transformed with acid into the salt which acts as the sole emulsifier in the various acid aqueous emulsion polymerizations.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a

group where at least one of the disconnected valences is attached to an electro-negative group, that is, a group which substantially increases the electrical dissymmetry or polar character of the molecule. Examples of compounds which contain a

group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinylpyridines; methyl vinyl ketone; vinylidene chloride. Such a synthetic rubber latex may be termed a "butadiene polymer synthetic rubber latex." The latices will contain dispersing agents from the polymerization generally in amount from 2% to 10% by weight of the solids of the latex of one or a mixture of anionic surface-active dispersing agents. The anionic surface-active dispersing agents which are used in the preparation of the polyvinylpyridine latices and the synthetic rubber latices may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compounds having the general formula R—SO₃M or R—OSO₃M, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. The synthetic rubber latex will have a pH from 8 to 14. In the preparation of the polyvinylpyridine latex and synthetic rubber latex alkali-metal hydroxide may be included in the polymerization recipe if necessary to obtain a pH from 8 to 14. This will not ordinarily be necessary with soap emulsifiers.

It is also desirable to incorporate in the latex 0.2% to 2%, based on the solids of the latex, of an alkali salt electrolyte, which is known to increase the particle size of synthetic rubber latices. The incorporation of the polyvinylpyridine latex in the synthetic rubber latex containing such alkali salt electrolyte will further increase the particle size of the latex. Such alkali salt electrolyte may be an alkali (potassium, sodium, ammonium or amine) salt of an acid such as carbonic, formic, acetic, sulfuric, hydrochloric, nitric or phosphoric acids. Examples of alkali salt electrolytes that may be used in the present invention are ammonium carbonate, ammonium bicarbonate, methyl amine carbonate, dimethyl amine carbonate, sodium formate, potassium acetate, sodium sulfate, potassium sulfate, sodium chloride, potassium chloride, sodium nitrate, and trisodium phosphate. Such alkali salt electrolyte may be present in the latex from the polymerization recipe or may be added with or after the polyvinylpyridine, or may in part be present from the polymerization recipe and in part be added with or after the polyvinylpyridine. Such 0.2% to 2% alkali salt electrolyte is in addition to the very small amounts of electrolyte that may be present in the latex from the catalysts, activators, sequestering agents, oxygen scavengers, emulsifiers and stabilizers from the polymerization recipe. The latex will conventionally have a solids content of 20% to 50%, and after the addition of the polyvinylpyridine, the particle size of the latex will be increased and the latex may readily be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration. The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention.

The following examples illustrate the invention. All parts and percentages referred to herein are by weight.

The polyvinylpyridine latex used in the examples was prepared by polymerizing for 20.5 hours at 50° C. a recipe consisting of 180 parts of water, 100 parts of 2-vinylpyridine, 0.3 part of potassium persulfate, 4.5 parts of potassium oleate, 0.5 part of the condensation product of sodium naphthalene sulfonate and formaldehyde, and 2 parts of tertiary dodecyl mercaptan modifier. The pH of the polyvinylpyridine latex was 9.0. The conversion of monomer to polymer was complete.

*Example 1*

Two synthetic rubber latices were prepared by polymerizing at 5° C. a recipe consisting of 130 parts of water, 70 parts of butadiene-1,3, 30 parts of styrene, 0.15 part of di-isopropyl benzene hydroperoxide, 0.2 part of sodium formaldehyde sulfoxylate, 0.015 part of ferrous sulfate heptahydrate, 0.03 part of the tetrasodium salt of ethylene diamine tetraacetic acid, 0.1 part of tertiary dodecyl mercaptan, 0.5 part of potassium sulfate, 4 parts of potassium oleate, 1 part of the condensation product of sodium naphthalene sulfonate and formaldehyde, and 0.03 part of sodium dithionite. The conversion of monomers to polymer was followed by measuring the solids of the reaction mixture at intervals. At 71% conversion of the first latex at the end of 7 hours, a solution of 0.5 part of the condensation product of sodium naphthalene sulfonate and formaldehyde in 20 parts of water was added to the first latex. At 72% conversion of the second latex at the end of 6 hours, a solution of 0.5 part of the condensation product of sodium naphthalene sulfonate and formaldehyde in 20 parts of water and 0.5 part of polyvinylpyridine as latex was added to the second latex. At the end of 10.5 hours the two latices were shortstopped by the addition of 0.2 part of potassium dimethyl dithiocarbamate as a 5% solution water.

The final conversion of the first latex was 97% and the average particle diameter was 520 Angstrom units. The final conversion of the second latex containing the polyvinylpyridine was 98% and the average particle diameter was 1310 Angstrom units.

*Example 2*

A control synthetic rubber latex A and two latices X and Y according to the present invention were polymerized on the same recipe as the synthetic rubber latices in Example 1. A second control synthetic rubber latex B was polymerized on a recipe similar to the recipe in Example 1 except that the amount of potassium oleate was 3 parts, the amount of the condensation product of sodium naphthalene sulfonate and formaldehyde was 0.5 part, and the amount of potassium sulfate was 1.5 parts. The polymerizations were carried out at 5° C. for eight hours at which time 0.2 part of potassium dimethyldithiocarbamate shortstop and 0.5 part of the condensation product of sodium naphthalene sulfonate and formaldehyde was added to each of the latices A, B, X and Y and 0.5 part of polyvinylpyridine as latex was also added to latices X and Y. The latices were stripped of unreacted monomers. The pH of the latices A, B, X and Y was 8 to 9. The conversions of latices A, B, X and Y were 83%, 75%, 82% and 86%, respectively, and the average particle diameters of latices A, B, X and Y were 1030, 1240, 1720 and 1600 Angstrom units, respectively. Control latices A and B were blended and latices X and Y were blended and the control blend latex AB and the blend latex XY according to the present invention were concentrated in a laboratory disc concentrator at 55° C. to 60° C. The control blend latex AB was concentrated to 52% solids content with a viscosity of 1520 centipoises, whereas the blend latex XY to which the polyvinylpyridine had been added was concentrated to 57% solids content with a viscosity of only 104 centipoises.

*Example 3*

The latex used in this example was prepared by polymerizing at 5° C. a recipe consisting of 130 parts of water, 70 parts of butadiene-1,3, 30 parts of styrene, 1.75 parts of potassium disproportionated rosin soap, 0.5 part of the condensation product of sodium naphthalene sulfonate and formaldehyde, 0.1 part of diisopropylbenzene hydroperoxide, 0.12 part of sodium formaldehyde sulfoxylate, 0.011 part of ferrous sulfate heptahydrate, 0.044 part of the tetrasodium salt of ethylene diamine tetraacetic acid, 0.03 part of sodium dithionite, and 0.09 part of tertiary dodecyl mercaptan. At 10% reactor solids, 2.75 parts of potassium oleate in 12.5 parts of water were added. The reaction was stopped at 80% conversion by addition of 0.2 part of potassium dimethyl dithiocarbamate as a 6% solution containing 0.02 part of potassium fatty acid soap. The residual butadiene and styrene monomers were stripped from the latex by venting off unreacted butadiene and steam distilling unreacted styrene. The latex had a pH of approximately 9.5.

To a portion of the latex was added 1.275 parts of potassium sulfate and 0.5 part of the condensation product of sodium naphthalene sulfonate and formaldehyde per 100 parts of latex solids. This latex portion had an average particle diameter of 840 Angstrom units. To another portion of the latex was added 1.275 parts of potassium sulfate, 0.5 part of the condensation product of sodium naphthalene sulfonate and formaldehyde, and 1 part of polyvinylpyridine as latex, per 100 parts of solids of the synthetic rubber latex. This latex portion treated according to the present invention had an average particle diameter of 1240 Angstrom units.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles of an alkaline butadiene polymer synthetic rubber latex which comprises incorporating in the synthetic rubber latex an alkaline polyvinylpyridine resin latex in amount to give 0.05% to 1% of polyvinylpyridine resin based on the solids of the synthetic rubber latex.

2. The method of increasing the size of the dispersed polymer particles of an alkaline butadiene polymer synthetic rubber latex which comprises incorporating in the synthetic rubber latex 0.2% to 2% of an alkali salt electrolyte and an alkaline polyvinylpyridine resin latex in amount to give 0.05% to 1% of polyvinylpyridine resin, said percentages being based on the solids of the synthetic rubber latex.

3. The method of increasing the size of the dispersed polymer particles of an alkaline butadiene polymer synthetic rubber latex which comprises incorporating in the synthetic rubber latex 0.2% to 2% of potassium sulfate and an alkaline polyvinylpyridine resin latex in amount to give 0.05% to 1% of polyvinylpyridine resin, said percentages being based on the solids of the synthetic rubber latex.

4. The method of increasing the size of the dispersed polymer particles of an alkaline synthetic rubber latex of a copolymer of butadiene-1,3 and styrene which comprises incorporating in the synthetic rubber latex an alkaline polyvinylpyridine resin latex in amount to give 0.05% to 1% of polyvinylpyridine resin based on the solids of the synthetic rubber latex.

5. The method of increasing the size of the dispersed polymer particles of an alkaline synthetic rubber latex of a copolymer of butadiene-1,3 and styrene which comprises incorporating in the synthetic rubber latex 0.2% to 2% of an alkali salt electrolyte and an alkaline polyvinylpyridine resin latex in amount to give 0.05% to 1% of polyvinylpyridine resin, said percentages being based on the solids of the synthetic rubber latex.

6. The method of increasing the size of the dispersed polymer particles of an alkaline synthetic rubber latex of a copolymer of butadiene-1,3 and styrene which comprises incorporating in the synthetic rubber latex 0.2% to 2% of potassium sulfate and an alkaline polyvinylpyridine resin latex in amount to give 0.05% to 1% of polyvinylpyridine resin, said percentages being based on the solids of the synthetic rubber latex.

7. The method of making a concentrated synthetic rubber latex which comprises incorporating in an alkaline butadiene polymer synthetic rubber latex having a solids content of 20% to 50%, an alkaline polyvinylpyridine resin latex in amount to give 0.05% to 1% of polyvinylpyridine resin based on the solids of the synthetic rubber latex, and then increasing the solids content of the latex to within the range of 55% to 70%.

8. The method of making a concentrated synthetic rubber latex which comprises incorporating in an alkaline butadiene polymer synthetic rubber latex having a solids content of 20% to 50%, an alkaline polyvinylpyridine resin latex in amount to give 0.05% to 1% of polyvinylpyridine resin based on the solids of the synthetic rubber latex, and then evaporating water from the latex until the latex is concentrated to a solids content of 55% to 70%.

9. The method of making a concentrated synthetic rubber latex which comprises incorporating in an alkaline butadiene polymer synthetic rubber latex having a solids content of 20% to 50%, from 0.2% to 2% of an alkali salt electrolyte, and an alkaline polyvinylpyridine resin latex in amount to give 0.05% to 1% of polyvinylpyridine resin, said percentages being based on the weight of solids of the latex, and then increasing the solids content of the latex to within the range of 55% to 70%.

10. The method of making a concentrated synthetic rubber latex which comprises incorporating in an alkaline butadiene polymer synthetic rubber latex having a solids content of 20% to 50%, from 0.2% to 2% of an alkali salt electrolyte, and an alkaline polyvinylpyridine resin latex in amount to give 0.05% to 1% of polyvinylpyridine resin, said percentages being based on the weight of solids of the latex, and then evaporating water from the latex until the latex is concentrated to a solids content of 55% to 70%.

11. The method of making a concentrated synthetic rubber latex which comprises incorporating in an alkaline butadiene polymer synthetic rubber latex having a solids content of 20% to 50%, from 0.2% to 2% of potassium sulfate, and an alkaline polyvinylpyridine resin latex in amount to give 0.05% to 1% of polyvinylpyridine resin, said percentages being based on the weight of solids of the latex, and then increasing the solids content of the latex to within the range of 55% to 70%.

12. The method of making a concentrated synthetic rubber latex which comprises incorporating in an alkaline butadiene polymer synthetic rubber latex having a solids content of 20% to 50%, from 0.2% to 2% of potassium sulfate, and an alkaline polyvinylpyridine resin latex in amount to give 0.05% to 1% of polyvinylpyridine resin, said percentages being based on the weight of solids of the latex, and then evaporating water from the latex until the latex is concentrated to a solids content of 55% to 70%.

13. The method of making a concentrated synthetic rubber latex which comprises incorporating in an alkaline synthetic rubber latex of a copolymer of butadiene-1,3 and styrene having a solids content of 20% to 50%, an alkaline polyvinylpyridine resin latex in amount to give 0.05% to 1% of polyvinylpyridine resin based on the solids of the synthetic rubber latex, and then increasing the solids content of the latex to within the range of 55% to 70%.

14. The method of making a concentrated synthetic rubber latex which comprises incorporating in an alkaline synthetic rubber latex of a copolymer of butadiene-1,3 and styrene having a solids content of 20% to 50%, an alkaline polyvinylpyridine resin latex in amount to give 0.05% to 1% of polyvinylpyridine resin based on the solids of the synthetic rubber latex, and then evaporating water from the latex until the latex is concentrated to a solids content of 55% to 70%.

15. The method of making a concentrated synthetic rubber latex which comprises incorporating in an alkaline synthetic rubber latex of a copolymer of butadiene-1,3 and styrene having a solids content of 20% to 50%, from 0.2% to 2% of an alkali salt electrolyte, and an alkaline polyvinylpyridine resin latex in amount to give 0.05% to 1% of polyvinylpyridine resin, said percentages being based on the weight of solids of the latex, and then increasing the solids content of the latex to within the range of 55% to 70%.

16. The method of making a concentrated synthetic rubber latex which comprises incorporating in an alkaline synthetic rubber latex of a copolymer of butadiene-1,3 and styrene having a solids content of 20% to 50%, from 0.2% to 2% of an alkali salt electrolyte, and an alkaline polyvinylpyridine resin latex in amount to give 0.05% to 1% of polyvinylpyridine resin, said percentages being based on the weight of solids of the latex, and then evaporating water from the latex until the latex is concentrated to a solids content of 55% to 70%.

17. The method of making a concentrated synthetic rubber latex which comprises incorporating in an alkaline synthetic rubber latex of a copolymer of butadiene-1,3 and styrene having a solids content of 20% to 50%, from 0.2% to 2% of potassium sulfate, and an alkaline polyvinylpyridine resin latex in amount to give 0.05% to 1% of polyvinylpyridine resin, said percentages being based on the weight of solids of the latex, and then increasing the solids content of the latex to within the range of 55% to 70%.

18. The method of making a concentrated synthetic rubber latex which comprises incorporating in an alkaline synthetic rubber latex of a copolymer of butadiene-1,3 and styrene having a solids content of 20% to 50%, from 0.2% to 2% of potassium sulfate, and an alkaline polyvinylpyridine resin latex in amount to give 0.05% to 1% of polyvinylpyridine resin, said percentages being based on the weight of solids of the latex, and evaporating water from the latex until the latex is concentrated to a solids content of 55% to 70%.

References Cited in the file of this patent

UNITED STATES PATENTS 2,444,801    Arundale    July 6, 1948
2,746,943    Pritchard    May 22, 1956